Nov. 14, 1950     J. W. DONALSON ET AL     2,529,925
BOAT TRAILER
Filed Aug. 27, 1946
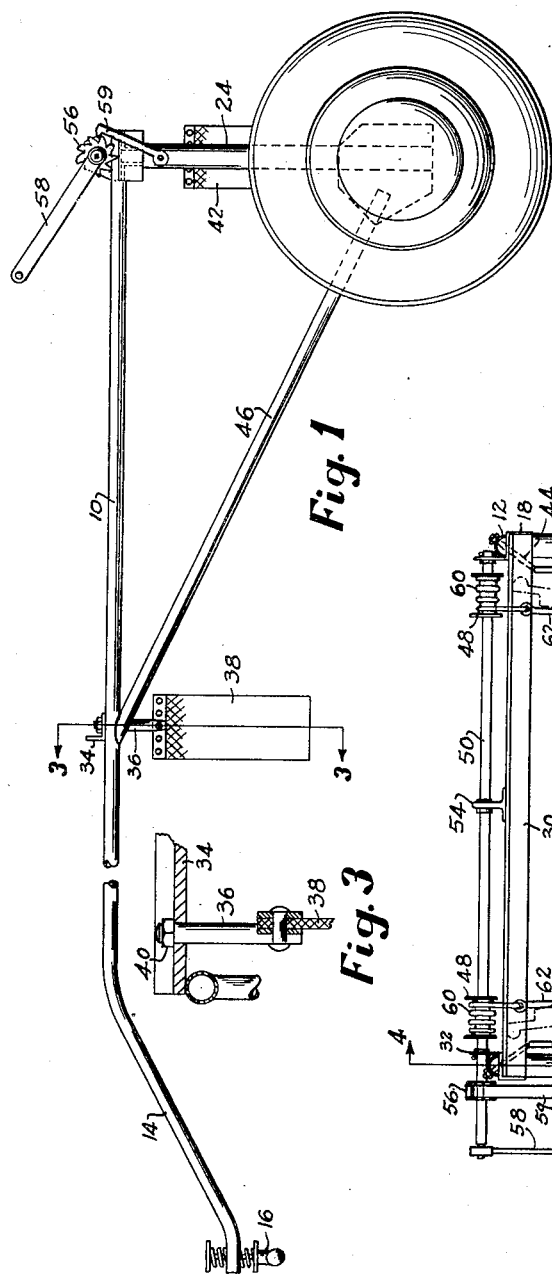
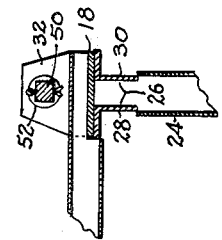
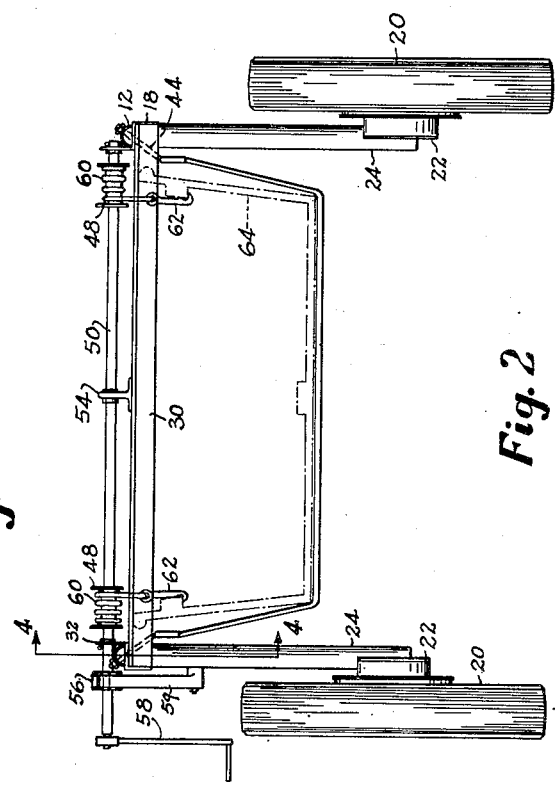
INVENTORS:
J. W. Donalson
K. B. Oberhansly
By:

Patented Nov. 14, 1950

2,529,925

UNITED STATES PATENT OFFICE 2,529,925

BOAT TRAILER

Joe W. Donalson and Keith B. Oberhansly, Panama City, Fla.; said Oberhansly assignor to Frederick B. Hanna, Logansport, Ind.

Application August 27, 1946, Serial No. 693,341

2 Claims. (Cl. 214—65)

This invention relates to load-carrying vehicles of the semi-trailer type adapted to be towed by a prime mover such as an automobile, and particularly to such a trailer for transporting a small boat, as a rowboat or the like.

It is an object of the invention to provide a trailer of the kind mentioned which is largely self-loading, that is, one in which the operations of raising a boat into its cradled position in the trailer may be carried out, if necessary, by one person. A further object is to simplify the construction and arrangement of the parts of the trailer so as to enable it to be produced at a minimum cost, and yet without in any way sacrificing strength or roadability.

A still further object is to design such a trailer for maximum flexibility of application, whereby the same trailer may be used to transport boats of different lengths and beams without the necessity of using any tools in the loading and securing operations.

The above and other objects and advantages of the invention will best be understood from the following detailed description of a preferred embodiment thereof, taken in connection with the appended drawings, in which Fig. 1 is a side elevation of the improved trailer, Fig. 2 is a rear elevation thereof, Fig. 3 is a partial sectional view taken on line 3—3 of Fig. 1, and Fig. 4 is a partial sectional view taken on line 4—4 of Fig. 2.

Referring now to Figs. 1 and 2 of the drawings, the main frame of the improved trailer is constituted by a pair of longitudinal tubular members designated 10 and 12 in the drawings, and preferably formed of heavy or extra-heavy pipe. These tubular members are approximately horizontal and in spaced-apart relation for most of their lengths, but converge toward one another and are bent downwardly, as at 14, near the leading end of the trailer. Any conventional form of trailer hitch 16 may be secured to the forward ends of the two members 10 and 12 for connection to the draft vehicle.

The under side of each member 10 and 12, for a short distance adjacent its rear end, is tenoned or dapped (as best shown in Fig. 4) to receive the flat central portion of a bracket 18, to which such members are welded. A pair of wheels 20 are rotatably secured to a pair of fish plates 22 which in turn may be welded to tenoned lower ends of a pair of spaced tubular uprights 24 which, like the members 10 and 12, may be formed of heavy pipe. The top end of each of uprights 24 is tenoned as at 26 (Fig. 4) to receive the ends of a pair of steel angle shapes 28 and 30, which extend in spaced relation across the rear of the trailer and constitute, together with uprights 24, an inverted U within which the boat to be carried will be received. The horizontal portions of the angle shapes 28 and 30 are welded or otherwise secured to the under side of the central portion of brackets 18. Each bracket 18 has a vertical leg 32 forming a bearing for a shaft to be described below.

Spanning the distance between members 10 and 12 somewhat forward of their central points is a steel angle 34 which may be welded to those members and serves as a cross brace therefor. As shown in Fig. 3, a bolt 36 passes through angle 34 adjacent each end thereof and has riveted or similarly secured thereto one end of a fabric supporting band 38 adapted to receive and support the bow end of a boat carried by the trailer. A nut 40 is threaded on each of the bolts 36 and serves to maintain the bolt in place against the weight of the boat. A similar supporting band 42 is supported by bolts 44 passing through members 10 and 12 adjacent their points of connection to angles 28 and 30. In order to provide additional bracing for the members 10 and 12, a tubular support 46 may be welded to each of such members beneath the angle 34, and extend downwardly and rearwardly so as to meet the fish plates 22, to which such supports may be welded or otherwise secured.

In order to enable a boat to be conveniently lifted into position where the bands 38 and 42 may be passed beneath it to hold it in elevated position, there is provided a hoist or lifting device best seen in Fig. 2. A pair of spools 48 each having a square central hole are adapted to be received upon a square shaft 50 which extends entirely across the rear end of the trailer. Shaft 50 is rotatably mounted in bearing apertures formed in the vertical extensions 32 of the brackets 18 mentioned above. A circular collar such as shown at 52 in Fig. 4 may be provided on the shaft at each of the bearing points, as well as at a central bearing member 54 mounted upon the cross angles 28 and 30. The left end of shaft 50, as viewed in Fig. 2, extends beyond its bearing, and has secured thereto a ratchet 56, while at its extreme end it is provided with a hand crank 58. As seen in Fig. 1, ratchet 56 is engageable by a pawl or keeper 59 pivotally secured to upright 24. A rope or cable 60 is wrapped around each spool 48 and is provided at its end with a hook 62 for engagement with the inner rail of a boat 64.

The operation of the device will now be clear. Assuming that the boat to be transported is lying on the ground, the trailer is manipulated (by hand if desired) until it occupies a position over said boat, with the bow of the boat extending forwardly of supporting band 38. One end of each band 38 and 42 is disconnected from the trailer and moved aside from the boat. Crank 58 is now rotated to unwind cables 60 so that hooks 62 may be engaged with the inner boat rail, as shown in Fig 2, whereupon rotation of the crank in the opposite direction will cause the boat to be raised until its top edge engages cross angles 28 and 30, whereupon ratchet 56 may be engaged by pawl 58 to support the boat while the operator fastens band 42 thereunder and operates the nuts on bolts 44 to clamp the boat tightly against the cross angles 28 and 30. It will be understood that the above operations will be facilitated if band 42 passes beneath the center of gravity of the boat 64, a condition which can readily be obtained by noting the slant of the boat when the lifting force through cables 60 is first applied, any necessary correction in the position of the trailer being made at that time with little difficulty.

The boat having been raised into position, the forward band 38 may now be secured beneath it in the same manner as band 42, and the boat is now ready to be transported overland as desired, it being understood that a suitable vehicle is attached to the hitch 16 for motive power. In order to unload the boat at its new location, the operations described above need only be repeated in reverse order, whereupon the trailer may be moved away from the boat leaving the latter ready for use.

It will have been observed that the use of a square shaft such as shaft 50 enables spools 48 to be moved therealong to adjust the distance between cables 60, so that different widths of boats may be handled without any changes in the arrangements of parts. Further, the provision of a central support 42 and a forward support band 38 permits boats of considerable differences in length to be carried, any reasonable excess length of the boat merely projecting rearwardly of the trailer without adversely affecting the operation of the device.

It has often been proposed to utilize trailer type vehicles for the motor transportation of small boats overland, but so far as is known all such proposals have involved structures requiring a considerable amount of labor for their loading, or have been extremely complicated, heavy and costly. Moreover, no one has ever before devised a trailer of this type which is adapted to use with boats of widely varying widths or beams. Such trailers as have been provided with hoisting means have always been of limited capacity, since the non-vertical lifting forces resulting from their use with boats of dimensions other than those for which the design was made, result in destructive forces upon the structures of the boats themselves, as well as making it difficult to lift them in an easy and satisfactory manner.

It will be seen from the above description that all the objects of the invention have been accomplished in a very simple manner, but it is to be understood that many changes and modifications may be made in the structure disclosed without departing from the spirit of the invention as defined in the appended claims.

What is claimed is:

1. A boat carrying trailer comprising: a pair of spaced longitudinal frame members, a transverse frame member connecting the spaced ends of said longitudinal members, a rotatable shaft mounted above and in the plane of said transverse member, a pair of vertical strut members extending downwardly from the ends of said transverse member, a wheel mounted at the lower end of each of said vertical members, a pair of winches slidably mounted on said shaft and adjustable axially of said shaft to exert vertical lift on the opposite sides of a boat, a flexible supporting member underlying said transverse member and having means at each end for permanently and adjustably securing the same adjacent the junction of said transverse members and said vertical members whereby to support a boat tightly against said transverse member without loading said winches.

2. A boat trailer as set forth in claim 1 including a second transverse member spaced from and parallel to said first transverse member and a second flexible support secured at each of its ends to the junction of said second transverse member and said longitudinal members.

JOE W. DONALSON.
KEITH B. OBERHANSLY.

REFERENCES CITED

The following references are of record in the file of this patent:

UNITED STATES PATENTS

| Number | Name | Date |
|---|---|---|
| 1,531,180 | Erickson | Mar. 24, 1925 |
| 2,161,578 | Johnson | June 6, 1939 |
| 2,260,676 | Lafaye | Oct. 28, 1941 |
| 2,301,994 | Atkinson | Nov. 17, 1942 |
| 2,375,754 | Ballinger | May 15, 1945 |
| 2,388,870 | Sackett | Nov. 13, 1945 |
| 2,415,771 | Van Agtmael | Feb. 11, 1947 |
| 2,425,252 | Larson | Aug. 5, 1947 |
| 2,427,667 | Gilbert | Sept. 23, 1947 |